United States Patent
Kurian et al.

(12) 
(10) Patent No.: US 6,281,325 B1
(45) Date of Patent: Aug. 28, 2001

(54) PREPARATION OF POLY(TRIMETHYLENE TEREPHTHALATE)

(75) Inventors: Joseph Varapadavil Kurian; Yuanfeng Liang, both of Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/644,008

(22) Filed: Aug. 23, 2000

Related U.S. Application Data
(60) Provisional application No. 60/150,580, filed on Aug. 25, 1999.

(51) Int. Cl.$^7$ ................................................. C08G 63/78
(52) U.S. Cl. ........................ 528/279; 528/283; 524/176; 524/178
(58) Field of Search ................................. 528/279, 283; 524/176, 178

(56) References Cited

U.S. PATENT DOCUMENTS

| | | | |
|---|---|---|---|
| 2,465,319 | 3/1949 | Whinfield et al. | 260/75 |
| 3,054,776 | 9/1962 | Higgins | 260/75 |
| 3,350,871 | 11/1967 | Pierce et al. | 57/140 |
| 3,671,379 | 6/1972 | Evans et al. | 161/173 |
| 3,904,561 | 9/1975 | Borman et al. | 260/22 R |
| 3,938,421 | 2/1976 | Hayashi . | |
| 4,018,708 | 4/1977 | Vogt . | |
| 4,166,896 | 9/1979 | Warner, Jr. | 528/301 |
| 4,250,281 | 2/1981 | Riecke | 525/444 |
| 4,611,049 | 9/1986 | Kuratsuji et al. | 528/279 |
| 5,340,909 | 8/1994 | Doerr et al. | 528/276 |
| 5,459,229 | 10/1995 | Kelsey et al. | 528/275 |
| 5,599,900 | 2/1997 | Bhatia | 528/491 |
| 5,663,281 | 9/1997 | Brugel | 528/272 |
| 5,688,898 | 11/1997 | Bhatia | 528/272 |
| 5,798,433 | 8/1998 | Schmidt et al. | 528/279 |
| 5,856,424 | 1/1999 | Bowers et al. | 528/272 |
| 5,872,204 | 2/1999 | Kuo et al. | 528/279 |
| 6,043,335 | 3/2000 | Banach et al. | 528/279 |
| 6,093,786 | 7/2000 | Kelsey | 528/271 |

FOREIGN PATENT DOCUMENTS

| | | |
|---|---|---|
| 0869141 | 10/1998 | (EP) . |
| 1 016 692 A1 | 7/2000 | (EP) . |
| 1 016 741 A1 | 7/2000 | (EP) . |
| 1 046 662 | 10/2000 | (EP) . |
| 1075689 | 7/1967 | (GB) . |
| 1 333 008 | 10/1973 | (GB) . |
| 1 390 793 | 4/1975 | (GB) . |
| 1 601 586 | 11/1981 | (GB) . |
| 51-140992 | 12/1976 | (JP) . |
| 8-232117 | 9/1996 | (JP) . |
| 9815559 | 4/1998 | (WO) . |
| 98/49216 | 11/1998 | (WO) . |
| 99/11845 | 3/1999 | (WO) . |
| 0017265 | 3/2000 | (WO) . |

OTHER PUBLICATIONS

Research Disclosure 28368 (Nov. 1987).
M. Patkar et al., "Effect of Diethylene Glycol (DEG) on the Crystallization Behavior of Poly(ethylene terephthalate) (PET)", Journal of Applied Polymer Science, vol. 47, 1749–1763 (1993).
Traub, "Synthesis and Textile Chemical Properties of Poly-trimethyleneterephthalate", Dissertation (Feb. 1994) (Translation).
S. Schauhoff et al., "New Developments in the Production of Polytrimethyleneterephthalate (PTT)", Man–Made Fiber Yearbook (1996).
Zeitler, "Cyclical Oligomers in Polyester", Milliand Textilberichte (1985).
DuPont Performance Chemicals, Tyzor® Organic Titanates and Zirconates, Organic Titanates as Polyesterification Catalysts, *Technical Information*, Feb. 28, 1998.
DuPont Performance Chemicals, Tyzor® Organic Titanates and Zirconates, Esterification and Transesterification Catalyst Selection Procedures, *Technical Information*, Feb. 28, 1998.
DuPont Performance Chemicals, Tyzor® Organic Titanates and Zirconates, Esterification and Transesterification Catalyst Selection Procedures, and Comparisons with Tin Catalysts, *Technical Information*, Feb. 28, 1998.
DuPont Performance Chemicals, Tyzor® organic titanates, *Technical Information*, Oct. 1, 1998.
DuPont Performance Chemicals, Tyzor® TPT Tetra–isopropyl Titanate, *Technical Information*, Feb. 28, 1998.
DuPont Performance Chemicals, Tyzor® TBT Tetra–nbutyl Titanate, *Technical Information*, Feb. 28, 1998.
DuPont Performance Chemicals, Tyzor® Organic Titanates and Zirconates Web Page, http://www.dupont.com/tyzor/index2.html, 1998.
DuPont Performance Chemicals, Tyzor® organic titanates, *Technical Information* (Selection Chart), Feb. 28, 1998.
Chemical Abstracts—English Abstract of XP–002151599.
Chemical Abstracts—English Abstract of XP–002151600.
Traub, H. L. et al., "Synthesis and Properties of Fiber–Grade Poly(Trimethylene Terephthalate)", Angewandte Makromolekulare Chemie, Applied Macromolecular Chemistry and Physics, De, Wiley VCH, Weinheim, vol. 230, Aug. 1, 1995 (Aug. 1, 1995), pp. 179–187.

*Primary Examiner*—Samuel A. Acquah

(57) ABSTRACT

In one embodiment, the invention is a process for the preparation of poly(trimethylene terephthalate) comprising (a) contacting terephthalic acid with 1,3-propanediol in the presence of an organic tin catalyst to form a bis(3-hydroxypropyl)terephthalate monomer; and (b) polymerizing said monomer in the presence of organic titanate polycondensation catalyst to obtain the poly(trimethylene terephthalate). In another embodiment, the invention is a process for the preparation of poly(trimethylene terephthalate) containing less than 1.6 mol % of DPG said process comprising contacting terephthalic acid with a 1.6 to 1 to 2:1 molar amount of 1,3-propanediol in the presence of 20 to 120 ppm (as tin), by weight of the poly(trimethylene terephthalate), of a organic tin catalyst, to form a bis(3-hydroxypropyl)terephthalate monomer and polymerizing said monomer to obtain the poly(trimethylene terephthalate). The invention is also directed to poly(trimethylene terephthalate) produced by the processes.

22 Claims, No Drawings

PREPARATION OF POLY(TRIMETHYLENE TEREPHTHALATE)

PRIORITY

This application claims priority benefit of U.S. Provisional Application No. 60/150,580, filed Aug. 25, 1999.

FIELD OF THE INVENTION

This invention relates to an improved process for the preparation of poly(trimethylene terephthalate) from 1,3-propanediol and terephthalic acid in which the levels of units from di(1,3-propylene glycol) ("DPG") in the polyester polymer are reduced.

TECHNICAL BACKGROUND OF THE INVENTION

Preparation of poly(trimethylene terephthalate) (3GT) polyester resins by (a) the transesterification of a $C_1$–$C_4$ dialkyl ester of terephthalic acid with 1,3-propanediol, or by the esterification of terephthalic acid with 1,3-propanediol, followed by (b) polycondensation is well known in the art.

Generally, in the transesterification reaction, a $C_1$–$C_4$ dialkyl ester of terephthalic acid and 1,3-propanediol are reacted in the presence of a transesterification catalyst at elevated temperature and atmospheric pressure to form bis-(3-hydroxypropyl)terephthalate monomer, along with small amounts of oligomer and $C_1$–$C_4$ monoalcohol byproduct. In the esterification reaction, terephthalic acid (TPA) and 1,3-propanediol are reacted in the optional presence of an esterification catalyst at elevated temperature and at atmospheric or superatmospheric pressure to form bis-(3-hydroxypropyl)terephthalate monomer, along with small amounts of oligomer and water byproduct. The bis-(3-hydroxypropyl)terephthalate monomer and any oligomer can then be polymerized at higher temperature under reduced pressure in the presence of a polycondensation catalyst to form the desired resin.

During the process for the preparation of 3GT (transesterification, esterification and polycondensation reactions), di(1,3-propylene glycol) can be formed from intermolecular dehydration of 1,3-propanediol. This di(1,3-propylene glycol) can be incorporated into the 3GT polymer chain which affects the properties of the resulting polymer, with respect to, for example, melting temperature, glass transition temperature, crystallinity, density, dyeablity, processability, etc. The effects of the analogous impurity, diethylene glycol (DEG), on poly(ethylene terephthalate) (PET) polymer properties are well documented in the literature. For commercial grade PET the DEG levels are usually around 2–4 mol %.

Processes for the preparation of polyesters, including 3GT, have been disclosed in many patents. Some disclose use of tin and titanium catalysts.

U.S. Pat. No. 2,465,319 mentions many types of catalysts including tin. Research Disclosure 28368 (November 1987) discloses preparation of poly(alkylene 2,6-napthalenedicarboxylate) polyesters using titanium alkoxides and dibutyl tin dilaurate, etc.

U.S. Pat. No. 3,350,871 and 3,671,379, and UK Patent Specification No. 1,075,689, Example 1, show preparation of poly(trimethylene terephthalate) from dimethyl terephthalate and trimethylene glycol using a catalyst prepared by dissolving 2.5 grams of sodium in 300 ml of n-butanol, adding 37 grams of tetrabutyl titanate, and diluting to 500 ml with n-butanol. Titanium dioxide is added as a delusterant.

U.S. Pat. No. 4,166,896 describes dibutyl tin oxide as a catalyst. U.S. Pat. No. 4,611,049 describes a process for producing an aromatic polyester using an organometallic catalyst selected from the group consisting of organotitanium compounds and organotin compounds, and at least one promoter selected from the group consisting of organic sulfonic acids and aliphatic carboxylic acids. Tetrabutyl titanate, tetraisopropyl titanate, dibutyl tin oxide and butylhydroxytin oxide are preferred.

U.S. Pat. No. 5,340,909 describes preparation of poly(1,3-propylene terephthalate) using tin and titanium catalysts. Catalysts mentioned include tetrabutyl titanate, tetraisopropyl titanate, butylstannoic acid, butyltin tris (2-ethylhexoate), stannous octoate, dibutyltin tris(2-etholhexoate), stannous octoate, dibutyltin oxide and methylene bis(methyltin oxide). Tetrabutyl titanate is used in both control and demonstration examples.

U.S. Pat. No. 5,663,281 describes a process for preparing polyester polymers. At column 6 it states that (trans) esterification reactions from 1,4-butanediol using tetrabutyl titanate are satisfactory, but risk forming undesirable by-products, whereas with 1,3-propylene glycol the risk of forming undesirable by-products using tetraalkyl titanates as catalyst is not as great and, thus, "more traditional" catalysts such as tetrabutyl titanate and antimony oxide can be used. Monobutyl tin oxide is used to catalyze 1,4-butanediol reactions.

U.S. Pat. No. 5,798,433 discloses a method of synthesizing polypropylene terephthalate using 30–200 ppm titanium in the form of an inorganic esterification catalyst containing at least 50 mole % $TiO_2$ precipitate, blocking the esterification catalyst after esterification by adding 10–100 ppm phosphorus in the form of a phosphorus-oxygen compound, and then performing precondensation and polycondensation in the presence of 100–300 ppm antimony. Table 1 shows a comparative example using titanium tetrabutylate as an esterification catalyst with antimony triacetate as a polycondensation catalyst.

U.S. Pat. No. 5,872,204 describes preparation of poly(1,3-propylene terephthalate) using ethylene glycol titanate as an esterification catalyst and polymerizing the resultant monomer in the presence of antimony acetate. At column 2 it is stated that ethylene glycol titanate does not hydrate, whereas tetrabutyl titanate does. The examples show use of ethylene glycol titanate, whereas comparative example 1 may have been directed to use of tetrabutyl titanate (compare column 12, lines 46 and 63).

None of these references mention DPG formation, specify DPG levels, nor cite the impact of DPG content on polymer end use properties, and none disclose methods to minimize DPG generation during the polymer preparation processes.

U.S. Pat. No. 5,865,424 described preparation of polyesters containing low levels of diethylene glycol wherein the reaction is carried out without a titanium catalyst.

U.S. Pat. No. 6,043,335 describes preparation of polyethylene and polybutylene terephthalates (which are stated to not have high levels of undesirable by-products) using a catalyst composition comprising a combination of a titanium-based compound, a zirconium-based compound and a phosphate-forming compound.

WO 98/23662 states that the condensation polymerization of polytrimethylene terephthalate "usually generates as much as about 4 mole percent of the bis(3-hydroxypropyl) ether which, in effect, becomes a comonomer and is incorporated into the polyester chain."

EP 1 016 692 and 1 016 741 describe polyester resin and fibers produced with no more than 2 weight % bis(3- hydroxypropyl) ether (DPG derived repeating unit). These documents describe use of metal catalysts such as titanium alkoxides (e.g., titanium tetrabutoxide or titanium tetraisopropoxide), antimony acetate or antimony trioxide. The preferred ester exchange catalysts are stated to be calcium acetate, magnesium acetate, zinc acetate and titanium acetate. In addition, they describe titanium, tin or antimony polycondensation catalysts, preferring titanium tetrabutoxide.

All of the aforementioned documents are incorporated herein by reference.

SUMMARY OF THE INVENTION

This invention is directed to improved process for preparing 3GT polyester having high strength, excellent elastic recovery, easy dyeability, and preferably containing low levels of DPG, and poly(trimethylene terephthalate) polyester processes.

In a first embodiment, this invention is directed to a process for the preparation of poly(trimethylene terephthalate) comprising (a) contacting terephthalic acid with 1,3-propanediol in the presence of an organic tin catalyst to form a bis(3-hydroxypropyl)terephthalate monomer; and (b) polymerizing said monomer in the presence of organic titanate polycondensation catalyst to obtain the poly(trimethylene terephthalate). Preferably, the molar amount of 1,3-propanediol:terephthalic acid is 1.4:1 to 2.2:1, most preferably 1.6:1 to 2:1. Preferably, the organic tin catalyst is used in an amount of 20–120 ppm (as tin), by weight of the poly(trimethylene terephthalate) produced.

In a second embodiment, a process for the preparation of poly(trimethylene terephthalate) containing less than 1.6 mol % of DPG said process comprising contacting terephthalic acid with a 1.6:1 to 2:1 molar amount of 1,3-propanediol in the presence of 20 to 120 ppm (as tin), by weight of the resultant poly(trimethylene terephthalate), of a organic tin catalyst, to form a bis(3-hydroxypropyl) terephthalate monomer and polymerizing said monomer to obtain the poly(trimethylene terephthalate).

Preferably, the organic tin catalyst is an organic tin oxide catalyst. Most preferably, the organic tin catalyst comprises one or more catalysts selected from the group consisting of n-butylstannoic acid, octylstannoic acid, dimethyltin oxide, dibutyltin oxide, dioctyltin oxide, diphenyltin oxide, tri-n-butyltin acetate, tri-n-butyltin chloride, tri-n-butyltin fluoride, triethyltin chloride, triethyltin bromide, triethyltin acetate, trimethyltin hydroxide, triphenyltin chloride, triphenyltin bromide, triphenyltin acetate. Most preferred is mono-n-butyltin oxide. The organic tin catalyst is preferably used in an amount of 90–120 ppm (as tin), by weight of the poly(trimethylene terephthalate).

Preferably, the organic titanate catalyst comprises one or more titanium tetrahydrocarbyloxide catalysts. Most preferred is tetraisopropyl titanate. Preferably, the organic titanate catalyst is used in amount of 10–100 ppm (as titanium), by weight of the poly(trimethylene terephthalate).

Preferably, the poly(trimethylene terephthalate) contains less than 1 mole % DPG.

The invention is also directed to the poly(trimethylene terephthalate) produced by the above processes.

Other and further objects, features, and advantages of the present invention will appear more fully from the following description.

DETAILED DESCRIPTIONS OF THE INVENTION

This invention relates to improved processes for the preparation of poly(trimethylene terephthalate) from 1,3-propanediol ("PDO") and terephthalic acid ("TPA") in which the levels of units from di(1,3-propylene glycol) ("DPG") (also known as "bis(3-hydroxypropyl) ether" or "BPE") are reduced. Such units have also been referred to as "copolymerized BPE". These units in the poly(trimethylene terephthalate) polymer actually have the formula

but are called "DPG" herein for convenience.

The most preferred polymer is poly(trimethylene terephthalate). Also preferred are blends and copolymers of poly(trimethlyene terephthalate). The polymer of the invention contains preferably about 80% or more of poly (trimethylene terephthalate) in mole percentage. It may be modified with up to 20 mole percent of polyesters made from other diols or diacids. The other diacids include isophthalic acid, 1,4-cyclohexane dicarboxylic acid, 2,6-naphthalene dicarboxylic acid, 1,3-cyclohexane dicarboxylic acid, succinic acid, glutaric acid, adipic acid, sebacic acid, 1,12-dodecane dioic acid, and the derivatives thereof such as the dimethyl, diethyl, or dipropyl esters of these dicarboxylic acids. The other diols include ethylene glycol, 1,4-butane diol, 1,2-propanediol, diethylene glycol, triethylene glycol, 1,3-butane diol, 1,5-pentane diol, 1,6-hexane diol, 1,2-, 1,3- and 1,4-cyclohexane dimethanol, and the longer chain diols and polyols made by the reaction product of diols or polyols with alkylene oxides.

The 3GT polymers of the invention preferably have less than 2 mole % DPG, more preferably less than 1.6 mole %, and most preferably less than 1 mole %.

The intrinsic viscosity of the polymers of the invention are in the range of 0.4–2.0 dl/g, preferably in the range of 0.6–2.0 dl/g and most preferably in the range of 0.7–2.0 dl/g.

To achieve the object of the present invention, 3GT polyester is prepared utilizing specific ratios of reactants and in the presence of specific catalysts.

The mole ratio of starting materials is 1.4:1 PDO:TPA or higher, preferably 1.6:1 or higher, and is 2.2:1 or less, preferably 2:1 or less. Operation at higher molar ratios than 2.2:1 leads to increased amounts of DPG formed. Preferably, bis(3-hydroxypropyl)terephthalate monomer is prepared using 20–120 ppm organic tin catalyst (as tin), by weight of the poly(trimethylene terephthalate).

The organic tin-containing compounds are preferred esterification catalysts. Examples of preferred tin compounds include, but are not limited to, n-butylstannoic acid, octylstannoic acid, dimethyltin oxide, dibutyltin oxide, dioctyltin oxide, diphenyltin oxide, tri-n-butyltin acetate, tri-n-butyltin chloride, tri-n-butyltin fluoride, triethyltin chloride, triethyltin bromide, triethyltin acetate, trimethyltin hydroxide, triphenyltin chloride, triphenyltin bromide, triphenyltin acetate, or combinations of two or more thereof. Tin oxide catalysts are preferred. The most preferred esterification catalyst is mono-n-butyltin oxide (also referred to as n-butyl stannoic acid), which can be obtained from the Witco Chemical Company, Greenwich, Conn.

Polycondensation to finished polymer is carried out in the presence of any of the customarily employed polycondensation catalysts. The preferred titanium compounds are organic titanate compounds. Titanium tetrahydrocarbyloxides, also referred to as tetraalkyl titanates herein, are presently most preferred organic titanium compounds because they are readily available and effective. Examples of suitable titanium tetrahydrocarbyloxide compounds include those expressed by the general formula Ti(OR)4 where each R is individually selected from an alkyl or aryl radical containing from 1 to about 30, preferably 2 to about 18, and most preferably 2 to 12 carbon atoms per radical and each R can be the same or different. Titanium tetrahydrocarbyloxides in which the hydrocarboxyl group contains from 2 to about 12 carbon atoms per radical which is a linear or branched alkyl radical are most preferred because they are relatively inexpensive, more readily available, and effective in forming the solution. Suitable titanium tetrahydrocarbyloxides include, but are not limited to, titanium tetraethoxide, titanium tetrapropoxide, titanium tetraisopropoxide (also known as "tetraisopropyl titanate"), titanium tetra-n-butoxide, titanium tetrahexoxide, titanium tetra 2-ethylhexoxide, titanium tetraoctoxide, and combinations of two or more thereof.

Titanium tetrahydrocarbyloxides suitable for use in the present invention can be produced by, for example, mixing titanium tetrachloride and an alcohol in the presence of a base, such as ammonia, to form the titanium tetracarbyloxide or tetraalkyl titanate. The alcohol can be ethanol, n-propanol, isopropanol, n-butanol, or isobutanol. Titanium tetrahydrocarbyloxides thus produced can be recovered by first removing by-product ammonium chloride by any means known to one skilled in the art such as filtration followed by distilling the titanium tetrahydrocarbyloxides from the reaction mixture. This process can be carried out at a temperature in the range of from about 0 to about 150° C. Titanates having longer alkyl groups can also be produced by transesterification of those having R groups up to $C_4$ with alcohols having more than 4 carbon atoms per molecule.

The preferred titanate is tetraisopropyl titanate (TPT). Tetra isopropyl titanate is commercially available as TYZOR® TPT from E. I. du Pont de Nemours and Company, Wilmington, Del., U.S.A. ("DuPont").

Polycondensation is preferably carried out using of 10–100 ppm titanate catalyst (as titanium metal), by weight of the poly(trimethylene terephthalate).

The low DPG polymers of the invention is preferably obtained by the use of mono-n-butyltin oxide as esterification catalyst followed by the use of tetraisopropyl titanate as polycondensation catalyst.

The esterification reaction is customarily carried out at atmospheric pressures (although above atmospheric pressures can be employed) and at temperatures of from 175–250° C. Temperatures from 200–230° C. are preferred.

The polycondensation reaction is customarily carried out at reduced pressures (below 1.0 mmHg) and at temperatures of from 230–280° C. Temperatures from 240–260° C. are preferred.

Additives known in the art such as antioxidants, UV stabilizers, pigments (e.g., $TiO_2$, etc.), flame retardants, antistats, dyes, and compounds that enhance the process, etc., may be used with this invention.

Use of a phosphate or a phosphate-forming compound, such as described in EP 1 016 741, EP 1 016 692 and U.S. Pat. No. 5,798,433, all of which are incorporated herein by reference, is not desirable with this invention.

Use of a promoter (organic sulfonic acids and aliphatic carboxylic acids) such as described in U.S. Pat. No. 4,611,049., incorporated herein by reference, is unnecessary, and probably undesirable with this invention.

Use of an aromatic organosphosphite and hindered phenol such as described in U.S. Pat. No. 6,043,335, incorporated herein by reference, is also unnecessary.

The polyesters of this invention have excellent crystallinity. The lower levels of DPG result in higher strength. These polyesters are useful in many of the end uses described in the art, particularly in fibers and yarns where they provide excellent strength. They are also useful in engineering resins, films and nonwovens, etc.

EXAMPLES

The following examples are presented to demonstrate the invention, but are not intended to be limiting. Therein, unless otherwise indicated, all percentages, parts, etc. are by weight.

Dimethylterephthalate and terephthalic acid were obtained from DuPont. Tetraisopropyl titanate was also obtained from Dupont (Tyzor® TPT organic titanate). Mono-n-butyltin oxide was obtained from Witco Chemical Company, (trade name: EURECAT 8200).

DPG content was measured using a Varian 3400 Gas Chromatograph (with flame ionization detector and all glass flow system from injector to detector). The Gas Chromatographic Column was 1.83 meter (length, 6 feet)×2 mm (inside diameter)×0.25 inch OD (outside diameter), glass, packed with 10% Carbowax 20M on 80/100 mesh Supelcoport. The column section in the injector and detector (beyond ferrule) did not have packing. The Septa was Thermogreen, LB-2 Part No. 2-0653M Supelco Inc., Bellefronte, Pa.

The following apparatus were used:
(1) Analytical Balance—capable of weighing 2 grams with a sensitivity of +/−0.0001 g.
(2) Reflux Apparatus—for heating samples, consisting of the following items available from Lab Glass, Inc.: A. Boiling Flask—25 ml round bottom with 14/20 ST joint, B. Heating mantle—with Variac autotransformer, and C. Condenser—water cooled.
(3) Hypodermic Syringe, 10 ml.
(4) Syringe—10 Ul.
(5) Stoppers (Teflon).
(6) Automatic Pipet—2-ml capacity.
(7) Pipet—disposable, 1-ml capacity.
(8) Injector Liner, glass.
(9) Vortex Shaker, Fisher Scientific Co.
(10) Centrifuge, Laboratory with 1.5 ml capacity.
(11) Vial, 2 ml. screw thread, Varian Part 66-000104-00.
(12) Auto sampler vial caps, Varian Part 16-00698-00.

The following reagents and materials were used:
1. 2-Aminoethanol (Ethanolamine or 2AE).
2. 2-Propanol (Isopropanol)—ACS Reagent Grade.
3. Benzyl Alcohol (BA)—Certified Grade, Fisher Cat. No. A396-500.
4. Dipropylene Glycol (DPG)—Degussa.
5. Boiling Chips—Boileezer, Fisher Scientific Cat. No. B-365.

Digestion Standard 0.2% was prepared by (a) weighing 4.000 g +/−0.005 g Benzyl Alcohol (BA) into a 50 ml beaker, (b) quantitatively transferring this to a 2000 ml volumetric flask, (c) filling the flask about ¾ full with ethanolamine (2AE) and mixing it by swirling, (d) diluting to the mark with ethanolamine (2AE), (e) adding a 1 in. stirring bar and stirring 1 hour to mix well. Prior to use the Digestion Standard was validated.

A 1.25% DPG Calibration Stock Solution was prepared by (a) weighing 6.25 grams dipropylene glycol into a 100 ml beaker, (b) placing a 1000 ml beaker on a p-4000 top load balance and tare, (c) quantitatively transferring the DPG from the 100 ml beaker on the balance, using ethanolamine (2AE) to rinse the DPG from the 100 ml beaker to the 1000 ml beaker, (d) adding ethanolamine (2AE) to 1000 ml beaker on balance to a total weight of 500.00 grams, (e) placing the beaker containing DPG and ethanolamine (2AE) on a magnetic stirrer and mixing for one hour, (f) weighing about one gram into a 25 ml flask and recording the weight to the fourth decimal, (g) running as regular sample and comparing results to the Stock Solution in service to confirm that it can be used, (h) transferring mixed DPG and ethanolamine (2AE) solution to a dispensette bottle, fitted with a 2.0 ml Brinkmann Dispensette, and (i) adjusting the Brinkmann Dispensette to deliver exactly 1.00 gram.

A 1.25% Calibration Working Solution was prepared by (a) dispensing exactly 1.00 gram of the 1.25% DPG Calibration Stock Solution into a 25 ml reaction flask, and weighing to get exactly 1.000 gms, (b) dispensing 2 ml of Digestion Standard into the flask with the one gram of Calibration Stock Solution, (c) adding 10 ml 2-propanol to the flask with the DPG and Digestion Standard, (d) closing with a Teflon stopper tightly and placing the flask on a Vortex-Genie vibrator and shaking for 30 seconds, (e) making a new solution when new digestion standard is added to the dispensette bottle.

Test specimens were 1 +/–0.1 g of polymer. With DPG levels above 2% proportionally less sample was used. The specimen was weighed to the fourth decimal, and then transferred to a reaction flask, and 3 or 4 boileezers were added. Then, 2.00 ml of Digestion Standard was added from an automatic pipet.

The Reaction Flask was fit with the condenser, making sure that the ground glass joints fit tightly, and cold water flowed through the condenser jacket. The heating mantle Place around the flask, and the flask was heated at a low reflux (2–3 drops/min) for 20 +/–1 min. The Variac control reflux rate was 2–3 drops/min. The flask and condenser were removed from the heating mantle. As soon as the boiling stopped, the inside of the condenser was washed with 10 ml of 2-Propanol. The first portion of the 2-Propanol was added slowly with shaking. As soon as solid started to form in the flask, the rest of the 2-Propanol was added as rapidly as possible. The condenser was removed from the flask, and stopped with a Teflon Stopper and shaken on Vortex Shaker for a minimum of 15 seconds. The solution in the digestion flask was transferred to the centrifuge tube. The centrifuge tube was placed in the freezer for 10 minutes, and then was centrifuged for 5 minutes or until the solid separated. The centrifuge tube was removed from the centrifuge and the clear portion of sample was transferred into the auto sample vial using a disposable pipete and then capped.

The Gas Chromatograph was set up according to the manufacturer's operation manual instructions, using the following conditions. The Gas Chromatograph had an injector temperature, range of 250 ±50° C., a detector temperature, range of 300±50 ° C., and a carrier gas flow, approximately 30 ml/minute. The oven temperature was 190° C. for 5 minutes, then was raised to 210C. at 10 degrees/minute and held for 8 minutes. The Range was 10 and the attenuation was 2.

The Integrator parameters were set in accordance with the instrument operating manual and the observed gas chromatographic curve.

1. Report unidentified peaks, no
2. Unidentified peak factor —0.000000
3. Noise Level, set to the minimum allowed value>100
4. Sample ID —DPG
5. Subtract blank baseline—no
6. Peak reject value—1000
7. Signal to noise ratio—5
8. Tangent peak height—10
9. Initial peak width—2

The chromatographic column was conditioned before use. The column was installed in the chromatograph with the temperature at 30° C. and was allowed to equilibrate for about 15 minutes. The oven temperature was increased to 225° C. The recorder was started and let to scan until a smooth and straight line was obtained. Then, the oven was set to the initial column temperature.

Manual calibration was performed using the 1.25% standard solution to calibrate the method. The response factor was calculated from the last two standard solutions run using the following formula to calculate a new response factor:

$$\frac{1.25}{\text{DPG AREA COUNTS}/\text{BA AREA COUNTS}} = \text{New Factor}$$

For example:

| PEAK NO. | PEAK NAME. | TIME (MIN) | RESULTS (%) | AREA COUNTS |
|---|---|---|---|---|
| 1. | BA | 3.206R | INT. STS. | 171912 |
| 2. | DPG | 8.532 | 1.010 | 179391 |
| | TOTALS: | | 1.010 | 103810312 |

$$\frac{1.25}{\frac{179391}{171912}} = 1.198 \longleftarrow \text{New Slope Factor}$$

This new Slope Factor was entered into the GC and a standard sample was run.

Once the Gas Chromatograph was set up, calibrated and conditioned, approximately 1 ml of each specimen or standard was transferred to an automatic sampler vial using a disposable pipet for each specimen. The vials were placed in the sampler and the analysis was started. Specimens were automatically run and calculated as % DPG. Then, the results were divided by sample weight.

For manual DPG calculations, the DPG/BA ratio was calculated for each specimen to the nearest 0.01 unit, using the following equation:

$$r=j/h$$

where: r=the ratio, j=the integrated area for DPG, and h=the integrated area for BA. The DPG for each specimen was calculated to the nearest 0.01 weight %, using the following equation:

$$P=R \times F/W$$

where: P=DPG, weight %, R=DPG/BA ratio, F=slope factor and W=specimen weight.

The precision was C.V.$\leq$1% DPG, and the range of the method is 0.5 to 2% DPG by weight, and smaller samples were used when DPG was greater than 2%.

The intrinsic viscosity was determined using a 0.4% by weight/volume solution (weight of polymer per unit volume of solution) of the polymer in 50/50 trifluoroacetic acid/dichloromethane using a Viscotek RTM Model Y-900 differential viscometer, at a temperature of 19° C. The viscometer is calibrated with samples of known viscosity.

Example 1

Batch preparation of poly(trimethylene terephthalate) from terephthalic acid and 1,3-propanediol with mono-n-butyltin oxide (Witco Chemical Company. Trade name:

EURECAT 8200). (calculated as 92 ppm of Sn in final polymer) as esterification catalyst and a mole ratio of 1,3-propanediol:TPA of 1.6: 1.

A 25 gallon autoclave was charged with 110 lbs. of terephthalic acid, 82.5 lbs. of 1,3-propanediol for a mole ratio of 1, 3-propanediol:TPA of 1.6: 1, and 10 g of mono-n-butyltin oxide. The temperature was raised to 210° C. and held for 7 hours. Water generated was removed as a liquid condensate by distillation.

After evolution of water had ceased, the resulting monomer, bis(3-hydroxypropyl)terephthalate, was transferred to a different clave and polymerized along with 13 ml of Tyzor® TPT at a temperature of 250° C. and a pressure of 0.4 mm Hg for 4 hours. The obtained poly(trimethylene terephthalate) resin was pelletized. The intrinsic viscosity of the polymer was 0.72 dl/g and DPG content was 1.1 mole %.

Comparative Example 1

Preparation of poly(trimethylene terephthalate) from terephthalic acid and 1,3-propanediol with Tyzor® TPT as esterification catalyst and a mole ratio of 1,3-propanediol:TPA of 1.8:1.

A 25 gallon autoclave was charged with 110 lbs. of terephthalic acid, 90 lbs. of 1,3-propanediol for a mole ratio of 1,3-propanediol:TPA of 1.8:1, and 10 ml of Tyzor® TPT. The temperature was raised to 210° C. and held for 12 hours. Water generated was removed as a liquid condensate by distillation.

After evolution of water had ceased, the resulting monomer, bis(3-hydroxypropyl)terephthalate, was transferred to a different clave and polymerized along with additional 10 ml of Tyzor® TPT at a temperature of 250° C. and a pressure of 0.3 mm Hg for 5 hours. The obtained poly(trimethylene terephthalate) resin was pelletized. The irtrinsic viscosity of the polymer was 0.76 dl/g and DPG content was 2.7 mole %.

Example 2

Batch preparation of poly(trimethylene terephthalate) from terephthalic acid and 1,3-propanediol with mono-n-butyltin oxide (calculated as 110 ppm of Sn in final polymer) as esterification catalyst and a mole ratio of 1,3-propanediol:TPA of 1.6:1.

A 25 gallon autoclave was charged with 110 lbs. of terephthalic acid, 82.5 lbs. of 1,3-propanediol for a mole ratio of 1,3-propanediol:TPA of 1.6:1, and 12 g of mono-n-butyltin oxide. The temperature was raised to 210° C. and held for 6 hours and 30 min. Water generated was removed as a liquid condensate by distillation.

After evolution of water had ceased, the resulting monomer, bis(3-hydroxy-propyl)terephthalate, was transferred to a different clave and polymerized along with 13 ml of Tyzor® TPT at a temperature of 250° C. and a pressure of 0.8 mm Hg for 3 hours 25 min. The obtained poly (trimethylene terephthalate) resin was pelletized. The intrinsic viscosity of the polymer was 0.72 dl/g and DPG content was 0.64 mole %.

Example 3

Batch preparation of poly(trimethylene terephthalate) from terephthalic acid and 1,3-propanediol with mono-n-butyltin oxide (calculated as 95 ppm of Sn in final polymer) as esterification catalyst and a mole ratio of 1,3-propanediol:TPA of 1.6:1.

A commercial autoclave was charged with 3360 kg of terephthalic acid, 2475 kg of 1,3-propanediol for a mole ratio of 1,3-propanediol:TPA of 1.6: 1, and 0.7 kg of mono-n-butyltin oxide. The temperature was raised to 210° C. and held for 10 hours and 10 minutes. Water generated was removed as a liquid condensate by distillation.

After evolution of water had ceased, the resulting monomer, bis(3-hydroxy-propyl)terephthalate, was transferred to a different clave and polymerized along with 1.6 kg of Tyzor® TPT at a temperature of 250° C. for 6 hours. The obtained poly(trimethylene terephthalate) resin was pelletized. The intrinsic viscosity of the polymer was 0.62 dl/g and DPG content was 0.65 mole %.

Example 4

Batch preparation of poly(trimethylene terephthalate) from terephthalic acid and 1,3-propanediol with mono-n-butyltin oxide (calculated as 95 ppm of Sn in final polymer) as esterification catalyst and a mole ratio of 1,3-propanediol:TPA of 2:1.

A commercial autoclave was charged with 3360 kg of terephthalic acid, 3095 kg of 1,3-propanediol for a mole ratio of 1,3-propanediol:TPA of 2:1, and 0.7 kg of mono-n-butyltin oxide. The temperature was raised to 220° C. and held for 11 hours and 50 minutes. Water generated was removed as a liquid condensate by distillation.

After evolution of water had ceased, the resulting monomer, bis(3-hydroxypropyl)terephthalate, was transferred to a different clave and polymerized along with 0.8 kg of Tyzor® TPT. The obtained poly(trimethylene terephthalate) resin was pelletized. The intrinsic viscosity of the polymer was 0.60 dl/g and DPG content was 1.55 mole %.

TABLE 1

| | DMT or TPA | Mole Ratio (PDO/DMT or TPA) | Catalyst | DPG Content |
|---|---|---|---|---|
| Example 1 | TPA | 1.6 | n-bu-tin oxide (92 ppm of Sn) | 1.1% |
| Comp. Expl. 1 | TPA | 1.8 | Tyzor ® TPT | 2.7% |
| Example 2 | TPA | 1.6 | n-bu-tin oxide (110 ppm of Sn) | 0.64% |
| Example 3 | TPA | 1.6 | n-bu-tin oxide (95 ppm of Sn) | 0.65% |
| Example 4 | TPA | 2 | n-bu-tin oxide (95 ppm of Sn) | 1.55% |

As illustrated in Example 1 versus Comparative Example 1, the type of esterification catalysts used in TPA based 3GT processes have a great impact on DPG generation. Use of mono-n-butyltin oxide as TPA/3G esterification catalyst can significantly reduce the level of DPG in 3/G polymer, compared to the use of Tyzor® TPT as the esterification catalyst. It is to be noted that the preferred catalyst in DMT transesterification is not the preferred catalyst in the TPA esterification process.

As illustrated in Example 3 versus Example 4, the mole ratio of PDO/TPA during the esterification reaction is an important variable with respect to DPG generation. The higher mole ratio of PDO/TPA leads to a higher content of DPG in the final polymer.

While the above examples demonstrate a batch process, the processes of this invention are also applicable to continuous processes such as shown in co-pending U.S. patent application Ser. Nos. 09/502,322, 09/502,642 and 09/503,599, all of which are incorporated by reference.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A process for the preparation of poly(trimethylene terephthalate) comprising (a) contacting terephthalic acid with 1,3-propanediol in the presence of an organic tin oxide catalyst to form a bis(3-hydroxypropyl)terephthalate monomer; and (b) polymerizing said monomer in the presence of organic titanate polycondensation catalyst to obtain the poly(trimethylene terephthalate).

2. The process of claim 1 wherein the organic tin oxide catalyst comprises one or more catalysts selected from the group consisting of n-butylstannoic acid, octylstannoic acid, dimethyltin oxide, dibutyltin oxide, dioctyltin oxide, diphenyltin oxide, tri-n-butyltin acetate, tri-n-butyltin chloride, tri-n-butyltin fluoride, triethyltin chloride, triethyltin bromide, triethyltin acetate, trimethyltin hydroxide, triphenyltin chloride, triphenyltin bromide, triphenyltin acetate.

3. The process of claim 1 wherein the organic titanate catalyst comprises one or more titanium tetrahydrocarbyloxide catalyst.

4. The process of claim 2 wherein the organic titanate catalyst comprises one or more titanium tetrahydrocarbyloxide catalyst.

5. The process of claim 1 wherein the molar amount of 1,3-propanediol:terephthalic acid is 1.4:1 to 2.2:1.

6. The process of claim 1 wherein the molar amount of 3-propanediol:terephthalic acid is 1.6:1 to 2:1.

7. The process of claim 1 wherein the organic tin oxide catalyst is used in an amount of 20–120 ppm (as tin), by weight of the poly(trimethylene terephthalate) and the organic titanate catalyst is used in amount of 10–100 ppm (as titanium), by weight of the poly(trimethylene terephthalate).

8. The process of claim 1 wherein the organic tin oxide catalyst is used in an amount of 90–120 ppm (as tin), by, weight of the poly(trimethylene terephthalate).

9. The process of claim 1 wherein the organic tin oxide catalyst is a mono-n-butyltin oxide catalyst.

10. The process of claim 1 wherein the organic titanate catalyst is a tetraisopropyl titanate polycondensation catalyst.

11. The process of claim 9 wherein the organic titanate catalyst is a tetraisopropyl titanate polycondensation catalyst.

12. A process for the preparation of poly(trimethylene terephthalate) containing less than 1.6 mol % of DPG said process comprising contacting terephthalic acid with a 1.6:1 to 2:1 molar amount of 1,3-propanediol in the presence of 20 to 120 ppm (as tin), by weight of the poly(trimethylene terephthalate), of a organic tin oxide catalyst, to form a bis(3-hydroxypropyl)terephthalate monomer and polymerizing said monomer to obtain the poly(trimethylene terephthalate).

13. The process of claim 12 wherein the organic tin oxide catalyst comprises one or more catalysts selected from the group consisting of n-butylstannoic acid, octylstannoic acid, dimethyltin oxide, dibutyltin oxide, dioctyltin oxide, diphenyltin oxide, tri-n-butyltin acetate, tri-n-butyltin chloride, tri-n-butyltin fluoride, triethyltin chloride, triethyltin bromide, triethyltin acetate, trimethyltin hydroxide, triphenyltin chloride, triphenyltin bromide, triphenyltin acetate.

14. The process of claim 12 wherein the organic tin oxide catalyst is a mono-n-butyltin oxide catalyst.

15. The process of claim 12 wherein the polymerizing said monomer is carried out in the presence of 10–100 ppm (as titanium metal), by weight of the poly(trimethylene terephthalate), of organic titanate catalyst comprising one or more titanium tetrahydrocarbyloxide catalyst.

16. The process of claim 14 wherein the polymerizing said monomer is carried out in the presence of an effective amount of tetraisopropyl titanate polycondensation catalyst.

17. The process of claim 14 wherein the polymerizing said monomer is carried out in the presence of 10–100 ppm (as titanium metal), by weight of the poly(trimethylene terephthalate), of tetraisopropyl titanate polycondensation catalyst.

18. The process of claim 15 wherein the polyester contains less than 1 mole % DPG.

19. The process of claim 7 wherein the organic titanate catalyst comprises one or more titanium tetrahydrocarbyloxide catalyst.

20. The process of claim 7 wherein the molar amount of 1,3-propanediol:terephthalic acid is 1.4:1 to 2.2:1.

21. The process of claim 7 wherein the molar amount of 1,3-propanediol:terephthalic acid is 1.6:1 to 2:1.

22. The process of claim 21 wherein the organic titanate catalyst comprises one or more titanium tetrahydrocarbyloxide catalyst.

* * * * *